Inventor.
Gerhard Polensky.

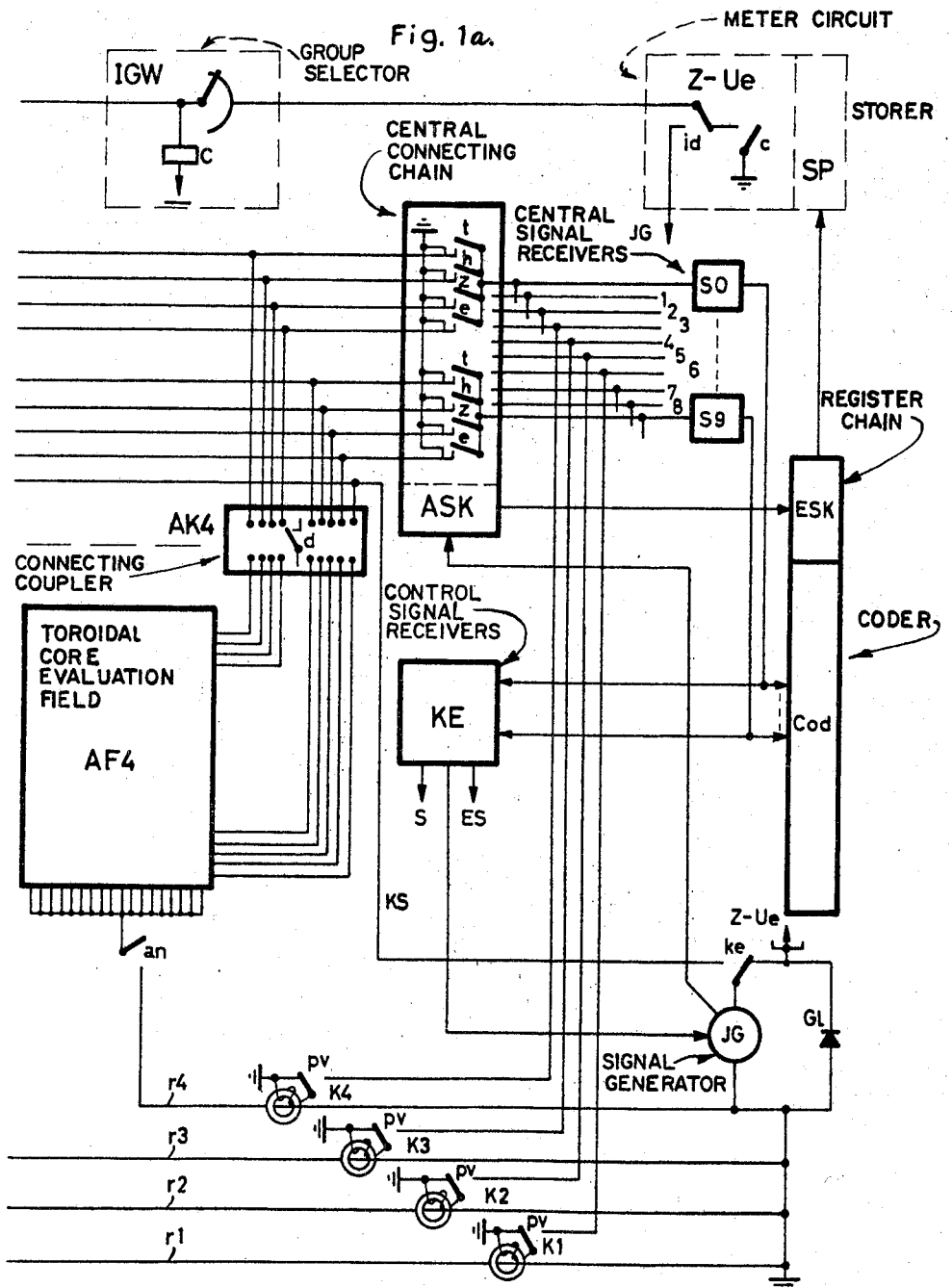

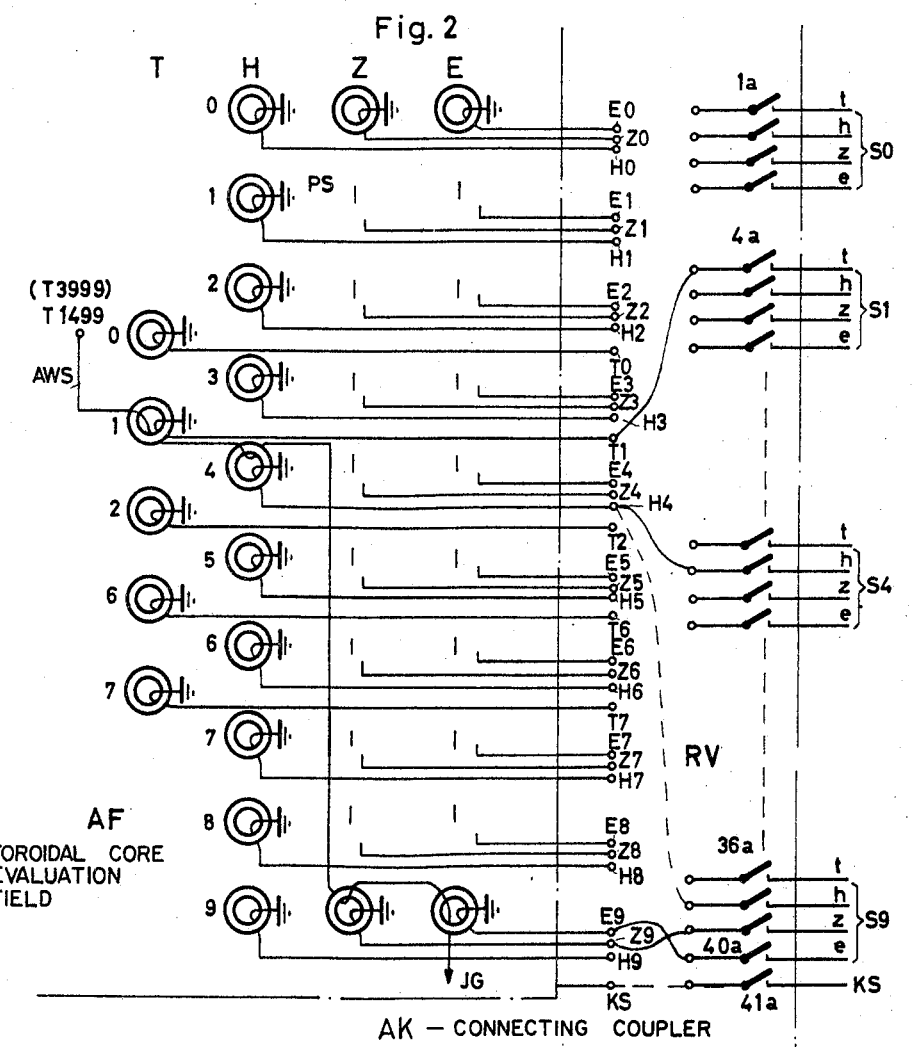
Fig. 2
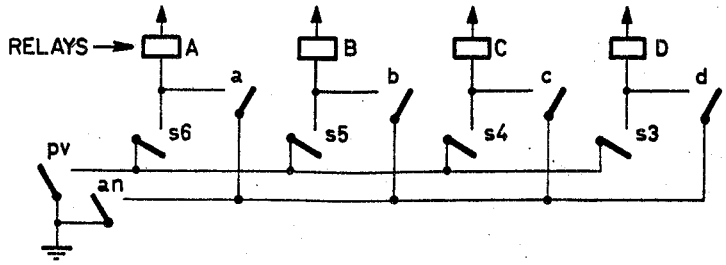

Fig. 3

| AF | 1 | 2 | 3 | 4 |
|---|---|---|---|---|
| T0 | 0000 – 0499 | 2500 – 2999 | 5000 – 5499 | 7500 – 7999 |
| T1 | 1000 – 1499 | 3500 – 3999 | 6000 – 6499 | 8500 – 8999 |
| T2 | 2000 – 2499 | 4500 – 4999 | 7000 – 7499 | 9500 – 9999 |
| T6 | 0500 – 0999 | 3000 – 3499 | 5500 – 5999 | 8000 – 8499 |
| T7 | 1500 – 1999 | 4000 – 4499 | 6500 – 6999 | 9000 – 9499 |

Fig. 4

| Nr. | T | H | Z | E | T | H | Z | E |
|---|---|---|---|---|---|---|---|---|
| 0 | 0 | 0 | 0 | 0 | 0 | 5 | 0 | 0 |
| 1 | 1 | 1 | 1 | 1 | 1 | 6 | 1 | 1 |
| 2 | 2 | 2 | 2 | 2 | 2 | 7 | 2 | 2 |
| 3 | — | 3 | 3 | 3 | — | 8 | 3 | 3 |
| 4 | — | 4 | 4 | 4 | — | 9 | 4 | 4 |
| 5 | — | 5 | 5 | 5 | — | 0 | 5 | 5 |
| 6 | 6 | 6 | 6 | 6 | 7 | 1 | 6 | 6 |
| 7 | 7 | 7 | 7 | 7 | 8 | 2 | 7 | 7 |
| 8 | — | 8 | 8 | 8 | — | 3 | 8 | 8 |
| 9 | — | 9 | 9 | 9 | — | 4 | 9 | 9 |

S...

1,3         2,4

AF...

March 17, 1970  G. POLENSKY  3,501,597
NUMBER IDENTIFICATION SYSTEM USING IDENTICALLY
WIRED EVALUATION FIELDS
Original Filed Oct. 1, 1962  5 Sheets-Sheet 5

Inventor:
Gerhard Polensky
By
Atty.

United States Patent Office 3,501,597
Patented Mar. 17, 1970

3,501,597
NUMBER IDENTIFICATION SYSTEM USING IDENTICALLY WIRED EVALUATION FIELDS
Gerhard Polensky, Munich, Germany, assignor to Siemens Aktiengesellschaft, Munich, Germany, a corporation of Germany
Continuation of application Ser. No. 571,133, Aug. 8, 1966, which is a continuation of application Ser. No. 227,611, Oct. 1, 1962. This application Oct. 28, 1968, Ser. No. 771,690
Claims priority, application Germany, Sept. 29, 1961, S 76,045
Int. Cl. H04m 3/22
U.S. Cl. 179—18                                   2 Claims

ABSTRACT OF THE DISCLOSURE

A circuit arrangement for determining the call numbers of subscriber stations which is formed of a plurality of toroidal core evaluation fields, identically wired with respect to one another, evaluation loops on the toroidal cores of the fields and connected to respective subscriber stations, and an evaluating circuit connected between the cores and a metering apparatus for converting the state of excitation of the cores into the call number associated with the respective excited cores. Respective ones of the evaluation loops are connected together to form evaluation circuits. The evaluation circuits which are connected in the same core combination in the different fields are associated with call numbers which differ from one another by the number of evaluation loops in each field. The re-evaluating circuit includes a plurality of switches which are actuated in response to the excitation of the cores associated with one evaluation circuit. These switches connect a signal corresponding to the excitation of the cores to the metering apparatus in such an order that the metering apparatus records the exact call number regardless of the identical wiring of each of the evaluation fields.

---

Cross references to related applications

The present application is a continuation of Ser. No. 571,133, filed Aug. 8, 1966, now abandoned, and said application Ser. No. 571,133 is in turn a continuation of Ser. No. 227,611, filed Oct. 1, 1962.

The present application relates to an improvement over a pending application Ser. No. 227,671, filed Sept. 28, 1962, now U.S. Patent No. 3,453,393, issued July 1, 1969.

The invention disclosed herein is concerned with a circuit arrangement for determining the call numbers of subscribers in telecommunication, and particularly in telephone systems.

The determination of the call numbers of subscribers in telecommunication, and particularly telephone systems, such as is necessary for instance in systems with automatic charge metering, is generally effected by transmitting a signal which effects the identification to the subscriber line via a connecting device arranged in the connection path, for instance central-office transmission or meter transmission.

In identification devices comprising a repeater matrix, for instance in the form of a toroidal core evaluation field, one of the evaluation loops characterizing the individual call numbers is in each case closed via a central source of signal current so as to effect the identification. Such repeater matrices comprise, in general, a number, corresponding to the number of places of the longest call number, of element columns characterizing the individual decades of call numbers and a plurality of element lines characterizing the individual digit values of each decade. In the case of toroidal core evaluation fields, the individual elements consist of ferromagnetic toroidal cores with which the individual evaluation loops are connected by simple threading through in such a manner that in each case there is energized by the evaluation loop conducting the identifying signal a number of toroidal cores corresponding to the number of places of the corresponding call number, the line position of which toroidal cores in the individual columns characterizes the digits per place of the call number. It is in this manner possible, for instance, in a toroidal core evaluation field with three columns and ten lines, to form a total of one thousand clearly distinguishable core combinations, corresponding to three-place call numbers.

The signal circuit which extends during the identifying operation over one of the evaluation loops generally also includes the connection path, the identifying signal being conducted to the connecting device lying in the connecting path to the subscriber line, while the evaluation loop is connected in the subscriber line circuit. In this connection, depending on the connection of the signal generator, the evaluation loop can be connected either to both line conductors of the trunk line or only on one line conductor with common return line to the signal generator, for instance via ground.

The fabrication of toroidal core evaluation fields, particularly those in which the evaluation loops are prefabricated is simple from the standpoint of production technique. It is, in this connection, a disadvantage that the maximum number of evaluation loops which can be threaded through a toroidal core depends upon the inside diameter of the toroidal cores. In order, therefore, to require only a minimum amount of space for any size of toroidal core fields, different sizes of toroidal cores would be necessary which, however, is not advantageous from an operating standpoint.

Identifying devices were therefore constructed, employing a plurality of smaller standard toroidal core evaluation fields. The number of the evaluation loops of such unit or standard toroidal core evaluation fields is, in the case of $n$-decade columns, as a rule between the orders of magnitude of $10^n$ and $10^{n-1}$, for instance, in the event that $n=$ four decade columns, between 10,000 and 1000, which is for example true of a toroidal core evaluation field having 2000 evaluation loops. When using toroidal cores with for instance 500 evaluation loops which can be threaded through, there are therefore required a total of four toroidal cores per thousands column and two toroidal cores per digit in the thousands decade, which lie in different lines corresponding to the different digits to be characterized from toroidal core field to toroidal core field, and thus require a different wiring of the evaluation loops per toroidal core field, which, however, is not advantageous for reasons of manufacturing technique.

The circuit arrangement in accordance with the invention is characterized by the fact that all toroidal core evaluation fields are constructed and connected in the same manner, that the evaluation loops are numbered continuously over all toroidal core evaluation fields, so that in each case the evaluation loops connected with the core combination in the different toroidal core evaluation fields from toroidal core evaluation field to toroidal core evaluation field are associated with a call number which is higher by the number of evaluation loops present for each toroidal core evaluation field and that the toroidal core combination corresponding to each evaluation loop is converted, insofar as necessary, into the call number associated with each evaluation loop by the use of a converting circuit controlled by signal receivers and connecting members which are already present. The utilization of the connecting members already present for each toroidal core evaluation field, in connection with the converting circuit, required by the similar construction of all toroidal core evaluation fields, makes it possible to lower the costs of manufacture for the toroidal core evaluation fields without additional expenditure for special switching members.

The connecting members can be used for controlling the converting circuit in two different manners. The one possibility consists in accordance with a further feature of the invention, in the connection of the test loops, associated individually with each toroidal core, in the generally customary manner through to the signal receiver corresponding to the position of the toroidal core in its column, but arranging a converting circuit to transmit the actually allocated digit under the control of the active connecting member which is associated with the active toroidal core evaluation field.

In order to keep the number of digit criteria to be converted as small as possible, it is advisable to divide the signal receivers corresponding to the number of differently evaluable digits present in each column of the toroidal core evaluation field, into groups which are similarly valid for all toroidal core evaluation fields, in such a manner that all signal receivers belonging to the same group, cause, together with the connecting member operating at the time, the registration of the same digit. The number of digit criteria to be converted as a function of the connecting member, and particuarly those of the incomplete highest decade, is in this way limited to a minimum, and control switches of the connecting member are thus saved.

The other possibility, which has the advantage over the one just indicated of being independent of the number of control switches available per connecting member, consists in connecting the testing loops individually associated with each torodial core and forming the secondary winding, deviating from the normally customary evaluation of the digit sequence determined by the corresponding combination of toroidal cores of an evaluation loop, to the signal receivers corresponding to the digits of the corresponding call number, and effecting a corresponding allocation by interchanged connecting of the test loops to the connecting member associated with each toroidal core evaluation field. Therefore, the digit sequences determined by the individual core combinations are no longer subject to a converting circuit, but rather, the evaluation is effected already by the interchanged connecting of the test loops to the connecting member and the actual digit sequence of the call numbers is thus registered by the signal receivers.

This principal can be applied also if—as is the rule generally in the incomplete highest decade column of each toroidal core evaluation field—a plurality of toroidal cores characterize the same digit. For these torodial core columns, the test loops of the toroidal cores characterizing this digit are to be switched through, connected in series, to the signal receiver characterizing the actual call-number digit.

Such a connection in series of the test loops is disadvantageous insofar as the series connection requires an additional matching of the signal-receiver inputs. The best is therefore a combination of the two possible solutions, whereby the signals registered by the signal receivers are evaluated by converting circuit for the incomplete highest toroidal core column of each toroidal core evaluation field while the correct evaluation in the subsequent decades is effected by interchanged connecting of the toroidal core test loops at the connecting member.

Such a combination of the two possibilities is particularly advantageous in the case of toroidal core evaluation fields having a numbr of evaluation loops differing from whole multiples of $10^{n-1}$, for instance $2.5 \cdot 1000$ in the case of $n=4$ toroidal core columns if, namely, in order to maintain the same group division of the signal receivers for all toridal core evaluation fields upon testing the incomplete highest decade, the signal receiver which is connectable to the toroidal cores of the same digit, in accordance with the order number permanently associated with them, are replaced for other connecting members associated with the same group by interchanged connection of the testing loops at each toroidal core evaluation field. A similar construction of all toroidal core evaluation fields of an identifying device can be in this manner accomplished with the slightest expense.

One embodiment of the invention is shown in the drawing, in which:

FIGS. 1 and 1a are an overall circuit diagram of an identifying device comprising a plurality of toroidal core evaluation fields;

FIG. 2 shows one of the toridal core evaluation fields with the associated connecting member;

Figure 5:
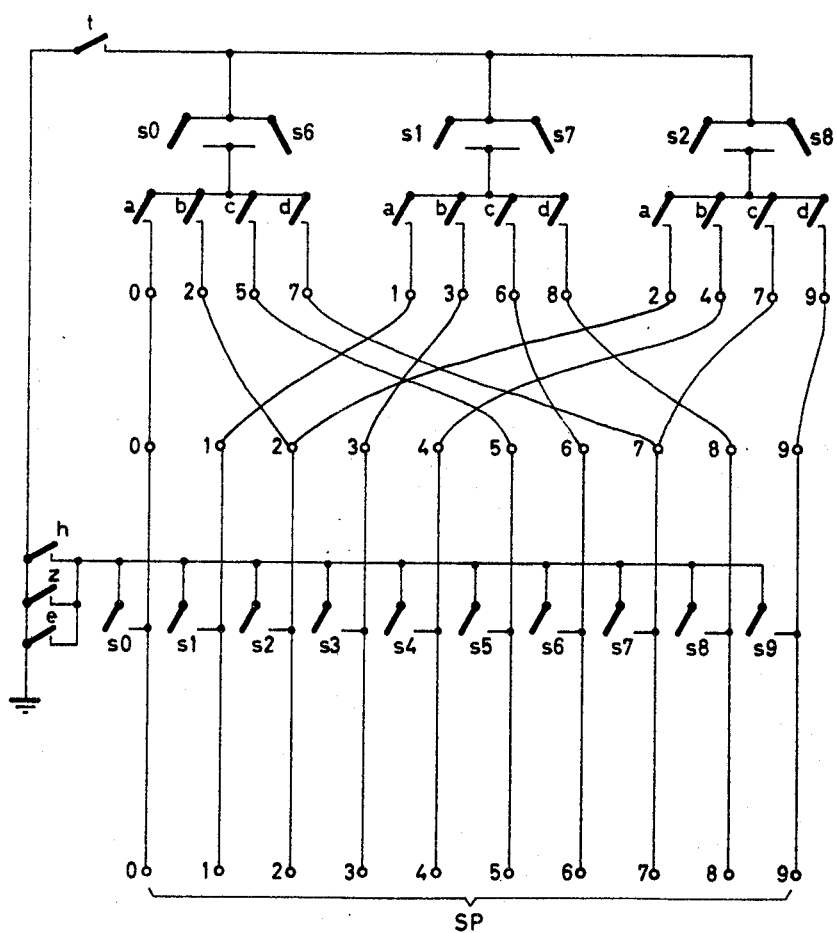

FIG. 3 indicates the distribution of the evaluation loops on the individual toroidal core evaluation fields and the cores of the incomplete highest decade column;

FIG. 4 represents the interchange connection of the test loops of the individaul toroidal core evaluation fields at the corresponding connecting member; and FIG. 5 shows the re-evaluation of the digits of the incomplete highest decade columns in each case.

In all figures, the showing is limited to the switching elements necessary for the understanding of the invention and the general course of the operation.

The connecting of the signal generator JG, which is made, for instance, as a pulse generator, takes place in the meter transmission Z–Ue. From there the signal circuit passes further over the group selector I.GW lying in the connecting path and the call finder AS to the distributor V where all identifiable subscribers' lines lie, brought together, and where the connecting of the evaluation loops AWS is therefore most suitable. Via the evaluation loops AWS with their individual decoupling elements EK and one of the four toroidal core evaluation fields AF1 to AF4, as well as one of the contacts $an$, the signal circuit passes back to the pulse generator JG.

In the return lines $r1$ to $r4$ of the individual toroidal core evaluation fields AF1 to AF4, are inserted the characterizing cores K1 to K4 to determine the toroidal core evaluation field to be connected in each case.

In accordance with an arrangement which has already been proposed, only one set of signal receivers S0 to S9 is provided. The connecting of these central signal receivers is controlled by the similarly centrally located connecting chain ASK which may be constructed as a relay chain or as a multi-wiper rotary selector switch. References $pv$, $t$, $h$, $z$ and $e$ indicate contacts of the connecting chain, the contacts $pv$ characterizing the testing step of the pre-elimination for the determination of the position of the corresponding evaluation loops in one of the four toroidal core evaluation fields, and the contacts $t$, $h$, $z$ and $e$ characterizing the first, second, third and last testing steps upon the determination of the call number. In condition of rest, all characterizing cores are short-circuited via the contacts $pv$ and thus not capable of transmission. The same is true of the toroidal cores of the toroidal core evaluation field connected in each case via the contacts $t$, $h$, $z$ and $e$, in order to avoid couplings of the evaluation loops with each other. The connecting couplers AK1 to AK4 serve for the selective connection of the toroidal core evaluation fields to the test lines common to all the toroidal core evaluation fields and leading to the signal receivers.

Figure 1:
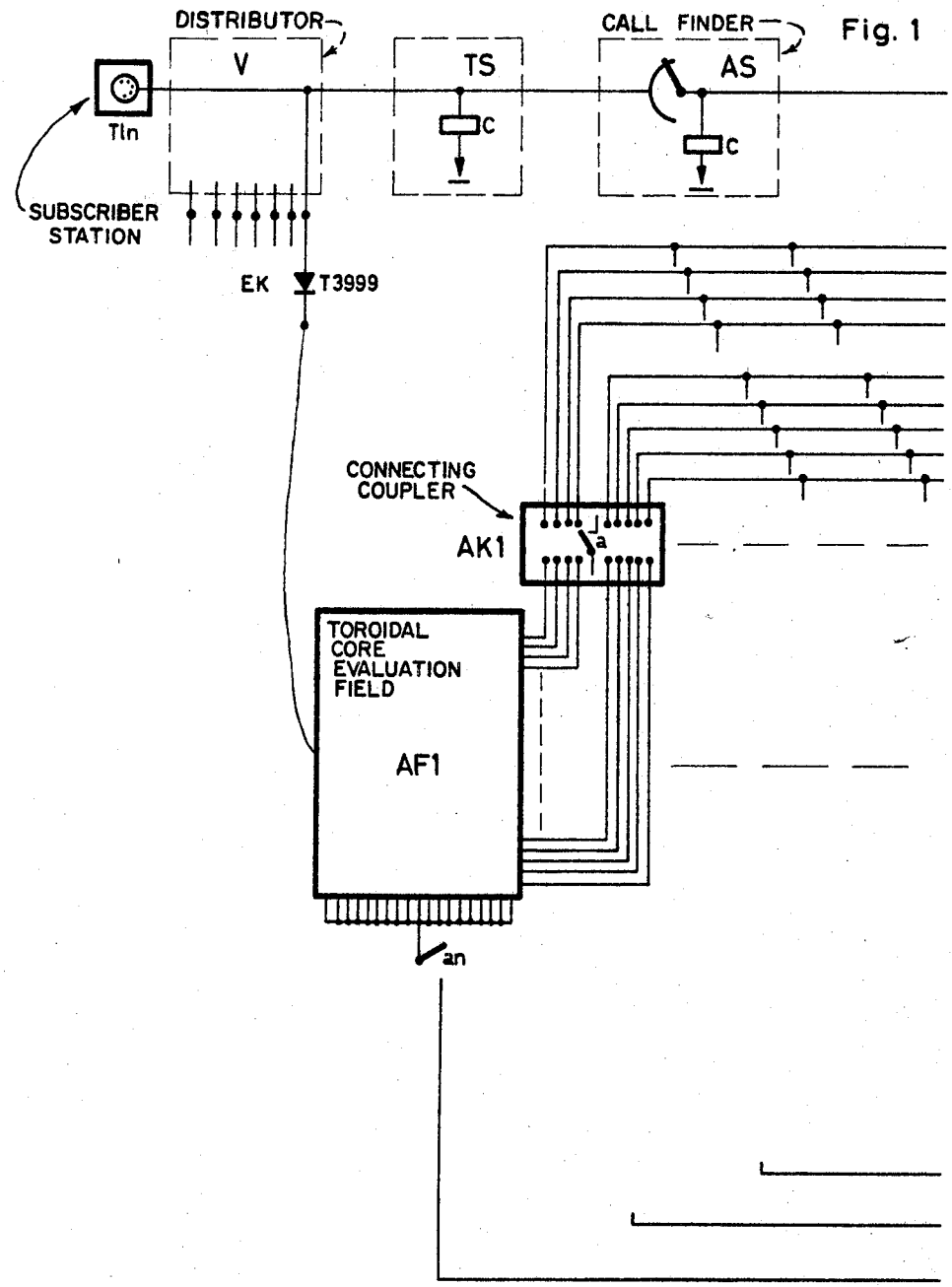

FIG. 1a also shows a common control device KE for testing the results recorded in each case by the signal receivers as to their definite unequivocal nature, a coder Cod and a register chain ESK for the registration in correct place of the call number digits in the storer Sp, which is associated in fixed association, for example, with each metering transmission Z–Ue.

FIG. 2 shows a toroidal-core evaluation field AF with the connecting coupler AK and in the lower part the control of all connecting couplers which are shown as simple relays A to D. The toroidal core evaluation field consists of in each case four toroidal core columns T, H, Z and E, corresponding to the thousands, hundreds, tens and units digits of a call number, for instance 3999. The columns H, Z, and E comprise in each case ten toroidal cores corresponding to the ten different digit values "1" to "0" per decade. For each of these toroidal cores, there is provided an individual testing loop PS which forms the secondary winding, which loops are brought to the corresponding connecting terminals E0 to E9, Z0 to Z9, H0 to H9, respectively, to which the test lines leading to the signal receivers S0 to S9 are connected via the contacts 1a to 40a. The core column T is not fully circuited with respect to the other core columns; it has merely five toroidal cores with the order numbers 0, 1, 2, 6 and 7.

The connecting coupler AK operates as follows:

As soon as, upon a testing step of the pre-elimination, the connecting chain ASK has closed its contacts pv and one of the signal receivers S6 to S3 connected to the characterizing cores K1 to K4 has recorded a signal, for instance the signal receiver S6, the connecting relay A can energize in a circuit extending from ground, pv, s6, A, to battery (—), such relay connecting itself via contact a in a holding circuit, and by means of its contacts 1a to 41a, connects the core field AF1 to the common signal receivers.

FIG. 3 shows the distribution of the evaluation loops to the toroidal cores of column T in the four toroidal core evaluation fields. Each toroidal core evaluation field is accordingly wired for 2500 evaluation loops. The wiring of the evaluation loops is the same for all toroidal core evaluation fields. Thus, for instance, the evaluation loops associated with the numbers 1499, 3999, 6499 and 8999 are connected in each case with the core combination supplying the same digit sequence 1499. In accordance with the invention, the evaluation of this digit sequence into the four different call numbers takes place in the following manner:

The digits of the toroidal cores lying in the columns T are recorded in the customary manner by the signal receivers which for the purposes of re-evaluation are converted by the converting circuit of FIG. 5 into groups which for all evaluation fields cause immediately the characterizing of the same digit.

As can be noted from FIG. 3, for the toroidal core evaluation field 1, the receivers S0 and S6 characterize the digit 0, the receives S1 and S7 the digit 1 and the receiver S2 the digit 2. The same group division applies to the toroidal core evaluation field 3 but not to the even-number toroidal core evaluation fields 2 and 4, since the latter in each case begin to count with the second half of the thousands groups of evaluation loops lying in each case with the first half in the preceding toroidal core evaluation field. The group comprising the signal receivers S0 and S6 would in these cases no longer characterize the same digits, but rather two different digits, namely 2 and 3 and 7 and 8, respectively. The same applies for the group comprising the signal receivers S2 and S7. In order, nevertheless, to maintain for all toroidal core evaluation fields, the group division given by the toroidal core evaluation field AF1, in accordance with the second manner of proceeding in accordance with the invention, the test loops of the toroidal cores 6 and 7 in the columns T are not in the case of the even-number toroidal core evaluation fields, connected through to the same signal receivers S6 and S7, but are connected at the connecting coupler with the test lines leading to idle signal receivers of groups characterizing the same digit. Since the group with the signal receivers S0 and S6 for the characterizing of the thousands digits 2 and 7 respectively is already engaged, the receiver groups S1 and S7 and S2 respectively and another signal receiver still remain for the remaining two digits 3 and 4 and 8 and 9 respectively per toroidal core evaluation field. On the other hand, in these two groups, the receivers S1 and S2 are already engaged for the digits 3 and 4 and 8 and 9 respectively, so that necessarily for the characterizing of the same digits, the receiver S7 must be connected to the test loop of the toroidal core T6 and a freely selectable signal receiver S8 which forms a group together with the signal receiver S2 is to be connected to the test loop of the toroidal cores T7 in the case of the even-number toroidal core evaluation fields.

FIG. 4 gives a corresponding table of the signal receivers S . . . to be connected to the test loops of the individual ring cores in the individual ring core evaluation fields, classified in accordance with the individual columns present in each toroidal core evaluation field. As can be noted from column T for the odd-numbered toroidal core evaluation fields, the toroidal cores present 0, 1, 2 as well as 6 and 7 are to be connected with the like signal receivers while in the case of columns T for the even-numbered toroidal core evaluation fields, this is true only for the toroidal cores 0, 1 and 2. The signal receivers 6 and 7 are on the other hand, for the reasons already indicated above, to be interchanged with the signal receivers 7 and 8.

Aside from the different thousands digits of the four call numbers already mentioned by way of example, namely 1499, 3999, 5499 and 8999, the corresponding evaluation loops of which are connected in each case with the core combinations supplying the same digit sequence, for instance 1499, there is furthermore a difference between the hundreds digits of these call numbers. To the digit 4 in the odd-evaluation fields, there corresponds the digit 9 in the even toroidal core evaluation fields, so that the hundreds digit 4 in the case of the even-numbered toroidal core evaluation fields is to be evaluated as the digit 9. As can be noted from FIG. 4, this evaluation is effected by corresponding interchange of the test loops upon the connecting to the through-connecting contacts of the connecting member. While corresponding to the column H of the odd-evaluation fields, the signal receivers S0 to S9 are to be connected with the toroidal cores of the same order digit, in the case of the even-numbered toroidal core evaluation fields, the signal receivers S0 to S9 are interchanged for those of an order digit which is higher by five, counting in cyclic sequence, and therefore signal receiver 5 takes the place of signal receiver 0, signal receiver 6 takes the place of signal receiver 1, etc.

The interchanged connecting of the test loops is apparent from FIG. 2. The evaluation loop AWS shown in the toroidal core evaluation fiield AF is normally associated with the call number corresponding to the digit sequence 1499. The test loops Ps of the individual cores are accordingly connected with the like receiver lines, namely, terminal T1 with the line t to the signal receiver S1, terminal H4 with the line h to the receiver S4, etc. In another toroidal core evaluation field, for instance AF2, the same digit sequence is associated with an evaluation loop having the call number 3999. In this case the terminal H4 is connected with the line h to the signal receiver S9 for the hundreds digit.

FIG. 5 shows, based on FIGS. 3 and 4, the conversion of the thousands digits recorded by the signal receivers in a common output multiple. The contacts t, h, z and e are step contacts of the common connecting chain ASK, the contacts s1 to s0 are control contacts of the signal receivers, and a, b, c and d are contacts of the connecting couplers AK for the four toroidal core evaluation fields AF1 to AF4.

In conclusion, the operation of the identifying device may be briefly explained with reference to an example. Let us assume that the subscriber Tln 3999 is connected with the metering transmission Z–Ue; with the seizure of the metering transmission Z–Ue—energization of the seizure or private relay V (not shown) of the meter transmission,—by the calling subscribed Tln 3999, control ground is applied upon the closing of the contact c to the incoming control wire s, thus maintaining the connection from the calling subscriber to the metering transmission. At the same time, the identifying device is in known manner seized and by means of contact *id* the pulse generator JG is connected to the control wire *s* which carries the signal current during the identifying operation.

The connecting chain ASK which is common to all toroidal core evaluation fields, is controlled, for example, by the pulse generator JG which was excited at the beginning of the identifying process by the meter transmission, while the further transmitting of the pulses is governed by the control device KE. With the first control pulse acting on the connecting chain ASK, the characterizing cores K1 to K4, serving for the pre-elimination, are operatively released by the contacts *pv* which become active upon the first switching step.

Since the evaluation loop characterizing the call number 3999 of the calling subscriber is wired in the toroidal core evaluation field AF2, a signal is recorded by the signal receiver S5, connected to the characterizing core K2, and by means of contact *s*5, the connecting relay B of the corresponding connecting coupler AK2 is operatively connected, which relay, via contacts similar to the contacts 1*a* to 41*a*, connects the toroidal core evaluation field AF2 to the signal lines leading to the common signal-receiver set.

At the same time, the result registered by the signal receivers is conducted to the central control device KE. If the result is definite and unequivocal, that is, if only one of the characterizing cores K1 to K4 was excited, then the pulse generator is caused to give off the next control pulse, and the connecting chain is thereby stepped to the next connecting step T. There now starts the actual testing operation for determining the call number of the calling subscriber. When testing the column T of the connected toroidal core evaluation field, the receiver S1 is excited, corresponding to the coding in accordance with FIG. 3, so that the digit line to the register S*p* of the metering transmission Z–U*e*, which line corresponds to the digit 3, is marked by coincidence between the corresponding step contact *t* and the corresponding receiver contact *s*1 and *a* contact *b* of the connecting coupler. Thereupon, in case of an unequivocal result, that is, only the signal receiver S1 has operatively responded, the connecting chain ASK is stepped further to the switch step *h*. In the subsequent testing of the decade H, the hundreds digit of the subscriber line to be identified is now determined directly, corresponding to the interchanged connecting of the test loop PS of the toroidal core H4, to the signal line to the receiver S9, and the corresponding digit line to the register SP is marked, via a contact *h* in series with the contact *s*9 of the signal receiver S9. The determination and transfer of the tens and units digits is effected further in known manner.

Changes may be made within the scope and spirit of the appended claims which define what is believed to be new and desired to have protected by Letters Patent.

I claim as my invention:

1. A circuit arrangement for determining the call numbers of subscribers in telecommunication systems, comprising a plurality of toroidal core evalution fields, the toroidal cores of which are respectively arranged in lines and columns, selectively excitable evaluation loops associated with the individual call numbers and subscribers' lines and each coupled with a core combination including one core of each column of one of said toroidal core evaluation fields for selectively activating the respective core combinations, a series of individually operable signal receiving means for coupling to the cores of each column of a selected evaluation field to identify the cores of the activated core combination, and connecting members for selective/actuation to connect said signal receiving means to the one of the individual toroidal core evaluation fields which has an activated core combination, characterized by said evaluation fields each having coupled therewith a predetermined number of evaluation loops less than the total number of possible core combinations of such evaluation field, all of said evaluation fields being similarly constructed and having a similar pattern of evaluation loops, the respective evaluation loops coupled with similar core combinations in the successive evaluation fields being allocated respective call numbers which differ by said predetermined number, and means comprising a converting circuit controlled by said series of selectively operable signal receiving means and by said connecting members for evaluating the call number of the activated core combination.

2. A circuit arrangement according to claim 1 characterized by the feature that the respective cores of first and second columns of cores of each evaluation field are arranged to be coupled to the same respective ones of said series of signal receiving means, while the respective cores of a third column of cores of certain of the evaluation fields are arranged to be coupled to different ones of said series of signal receiving means, such that the digits of the call numbers represented by the respective ones of said series of signal receiving means are the same in the evaluation of the first, second and third columns of cores of all of the evaluation fields.

References Cited

UNITED STATES PATENTS

| | | | |
|---|---|---|---|
| 2,657,272 | 10/1953 | Dimond. | |
| 3,032,747 | 5/1962 | French. | |
| 2,843,838 | 5/1958 | Abbott | 179—18 |
| 2,960,682 | 11/1960 | French | 340—147 |
| 2,965,883 | 7/1962 | Miller | 340—166 |
| 3,047,840 | 7/1962 | Harms et al. | 179—18 |
| 3,231,680 | 1/1966 | Yamato et al. | 179—18 |
| 3,200,203 | 8/1965 | Bray et al | 179—18 |
| 3,290,445 | 12/1966 | Fischer et al. | 179—18 |

WILLIAM C. COOPER, Primary Examiner

U.S. Cl. X.R.

340—166